United States Patent
Xu et al.

(10) Patent No.: US 7,663,817 B1
(45) Date of Patent: Feb. 16, 2010

(54) OPTICAL SYSTEM WITH PLANO CONVEX LENS

(75) Inventors: Jing Xu, Irvine, CA (US); Roman C. Gutierrez, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 21 days.

(21) Appl. No.: 11/625,204

(22) Filed: Jan. 19, 2007

(51) Int. Cl.
*G02B 7/02* (2006.01)

(52) U.S. Cl. .................... 359/811; 359/819; 359/448

(58) Field of Classification Search .............. 359/809, 359/811, 819, 820, 534, 547, 407, 423, 425, 359/448, 449, 457, 725–728, 744; 396/150, 396/287, 327, 385, 354, 429; 355/20, 46, 355/50; 362/581; 600/551; 404/16
See application file for complete search history.

(56) References Cited

U.S. PATENT DOCUMENTS

| | | | | |
|---|---|---|---|---|
| 2,428,797 A * | 10/1947 | Gardner | .................. | 356/12 |
| 3,182,576 A * | 5/1965 | Papke | .................. | 396/150 |
| 4,115,701 A * | 9/1978 | Guichard | .................. | 250/552 |
| 4,544,252 A * | 10/1985 | Tsukamoto | .................. | 396/287 |
| 6,927,927 B2 * | 8/2005 | Isono | .................. | 359/793 |
| 7,088,530 B1 * | 8/2006 | Recco et al. | .................. | 359/811 |
| 7,167,323 B2 * | 1/2007 | Isono | .................. | 359/791 |
| 2006/0061881 A1 * | 3/2006 | Liao | .................. | 359/784 |

* cited by examiner

*Primary Examiner*—Loha Ben
(74) *Attorney, Agent, or Firm*—Haynes & Boone, LLP.

(57) ABSTRACT

An optical system for a miniature camera is disclosed. The optical system can have a lens holder including mounting features to position a plurality of lenses. The mounting features can include mounting features that are configured to position a first plastic lens proximate an aperture end portion of the lens holder and/or mounting features that are configured to position a glass plano-convex lens along an optical path through an interior of the lens holder with a substantially planar surface of the glass plano-convex lens positioned toward the aperture end portion of the lens holder.

17 Claims, 3 Drawing Sheets

OPTICAL SYSTEM WITH PLANO CONVEX LENS

BACKGROUND

1. Field of Invention

This invention generally relates to optical systems; particularly, to optical systems for miniature cameras.

2. Related Art

Miniature cameras are currently available with many electronic devices, such as cellular telephones, laptop computers, personal digital assistants (PDAs), and the like. Miniature cameras are also available as stand-alone devices for applications such as security and surveillance The market for miniature cameras is rapidly expanding. For example, camera-equipped cell phones were unheard of just a few years ago; now, they are a significant portion of the cell phone market.

High resolution cell phone cameras (2 million or more pixels) generally use at least one glass lens and at least one plastic lens. Glass lenses for miniature cameras have a relatively high manufacturing cost compared to plastic lenses, due to their small size and high accuracy requirements.

SUMMARY

An optical system for a miniature camera is disclosed. According to an example of an embodiment of the present invention, the optical system can comprise a lens holder including mounting features to position a plurality of lenses. The mounting features can comprise mounting features that are configured to position a first plastic lens proximate an aperture end portion of the lens holder and/or mounting features that are configured to position a glass plano-convex lens along an optical path through an interior of the lens holder with a substantially planar surface of the glass plano-convex lens positioned toward the aperture end portion of the lens holder.

According to an example of an embodiment of the present invention, a mobile electronic device can comprise a miniature camera having a light receiving end portion and an imaging end portion. The miniature camera can comprise a first plastic lens positioned at the light receiving end portion of the miniature camera and a glass plano-convex lens positioned between the first plastic lens and the imaging end portion of the miniature camera.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein provide for high quality miniature camera systems with reduced cost and complexity.

As noted above, lens systems for miniature cameras generally use at least one glass lens and at least one plastic lens. One example of a lens system is a 3P1G lens configuration (three plastic lenses, one glass lens). Known approaches for 3P1G lens systems use a glass lens as the first lens. However, the first lens is aspheric, and needs to be precisely manufactured and positioned to provide the requisite centration. This makes the systems relatively expensive and difficult to manufacture.

Figure 1:
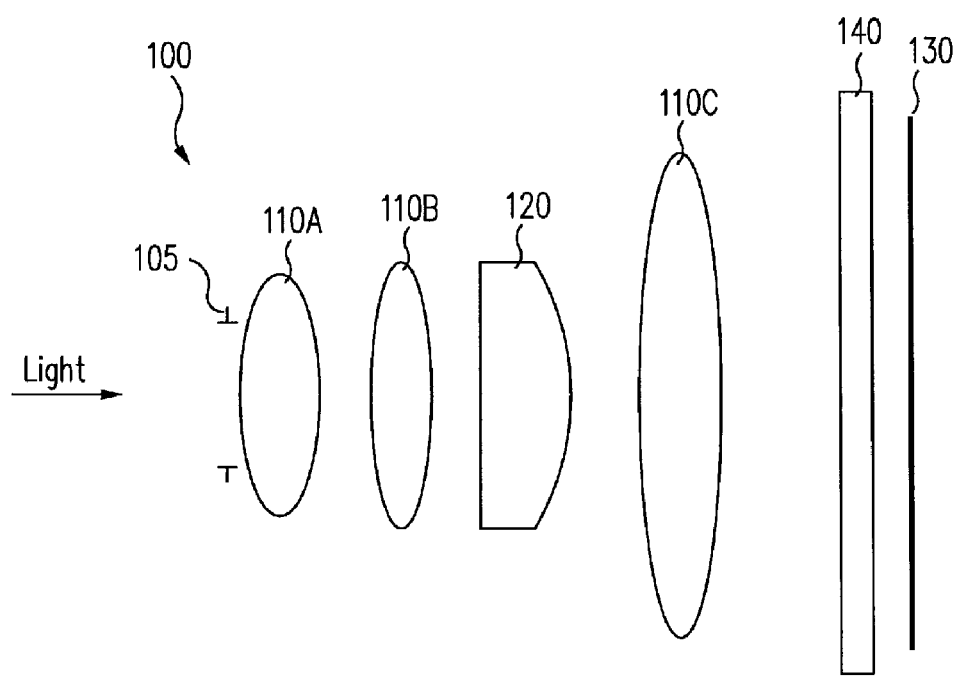
FIG. 1 is a side view of a lens assembly, according to some embodiments.

Systems and techniques provided herein allow for high performance lens systems for miniature cameras that are relatively inexpensive. FIG. 1 shows a lens system 100, according to some embodiments.

System 100 includes an aperture stop 105, plastic aspheric lenses 110A, 110B, and 110C, and glass plano-convex lens 120. Light entering system 100 is first modified by plastic lens 110A, then plastic lens 110B. Light from plastic lens 110B is incident on the planar side of glass plano-convex lens 120. Light from the convex side of glass plano-convex lens 120 is incident on plastic lens 110C and then on an imager 130 through protective glass 140. Imager 130 may be a CMOS imager, a CCD imager, or other appropriate imager. In general, de-centration of lens surfaces has the most impact on the performance of a lens system. This presents a substantial challenge as the size of lens systems is reduced.

Since the flat surface of lens 120 does not change as lens 120 is displaced laterally, only the de-centration of the spherical surface of lens 120 affects the performance of lens 120. As a result, the tolerance for de-centration of the spherical surface of 120 may be much looser than systems in which a glass lens is placed in the first lens position. For example, the tolerance may be on the order of three times looser than the tolerance of a system with the glass lens in the first position. Alternately, the performance of a glass lens in system 100 may be substantially better than the performance of a system with a glass lens in the first position having a comparable tolerance.

Figure 3:
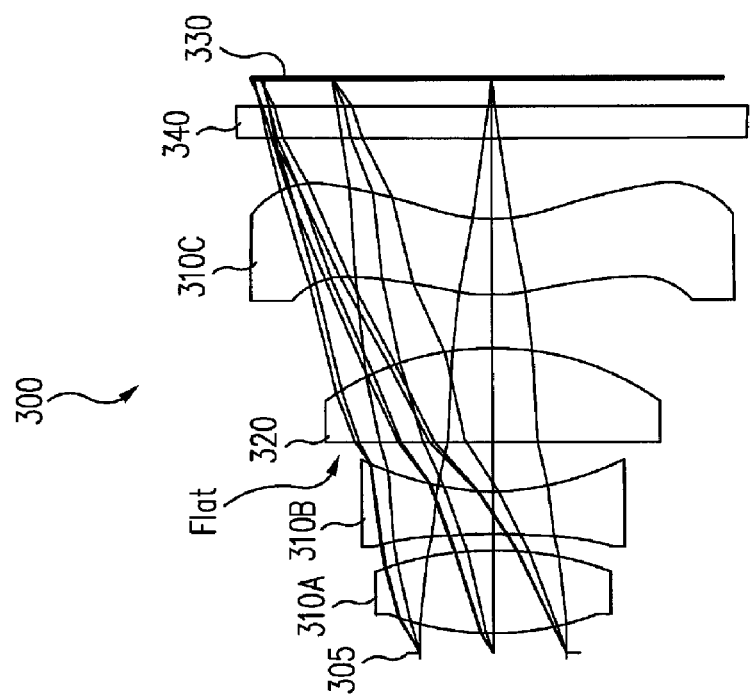
FIG. 3 is a side view of another lens assembly, according to some embodiments.
Figure 2:
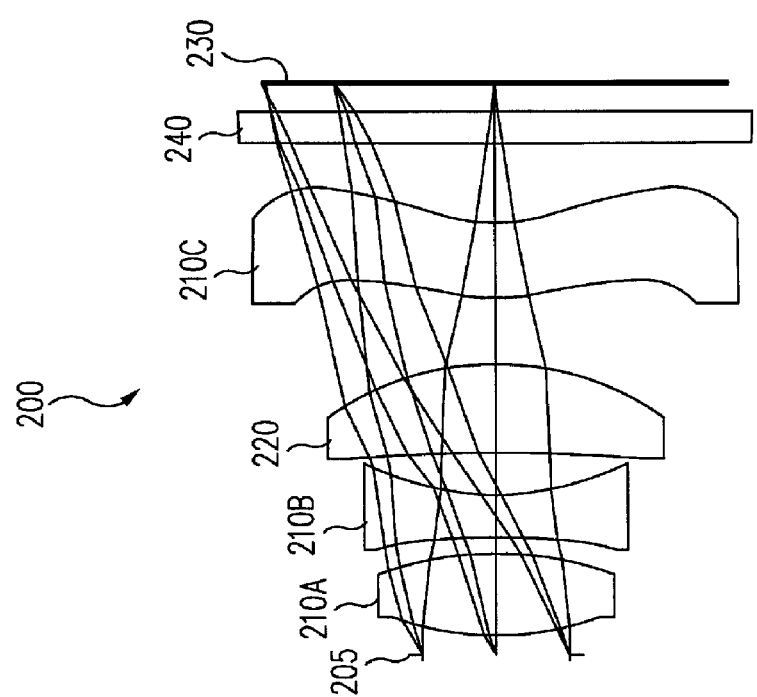
FIG. 2 is a side view of another lens assembly, according to some embodiments.

FIGS. 2 and 3 show embodiments of lens systems 200 and 300, according to different embodiments. In FIG. 2, plastic lenses 210A, 210B, and 210C are positioned at the first, second, and fourth positions of the lens assembly. Plano-convex glass lens 220 is at the third position, with the substantially planar surface oriented toward the aperture stop 205. Light from the lenses is incident on the imager 230 through a protective window 240. The implementation of FIG. 2 is configured for a 28.3 degree horizontal field of view (HFOV) at an image height of 2.2 mm.

Similarly, FIG. 3 includes plastic lenses 310A, 310B, and 310C positioned at the first, second, and fourth positions of the lens assembly. Plano-convex glass lens 320 is at the third position, with the substantially planar surface oriented toward the aperture stop 305. Light from the lenses is incident on the imager 330 through a protective window 340. The implementation of FIG. 3 is configured for a 28.6 degree horizontal field of view (HFOV) at an image height of 2.2 mm, for a distance of about 0.15 mm between lens 310B and lens 320.

Figure 4:
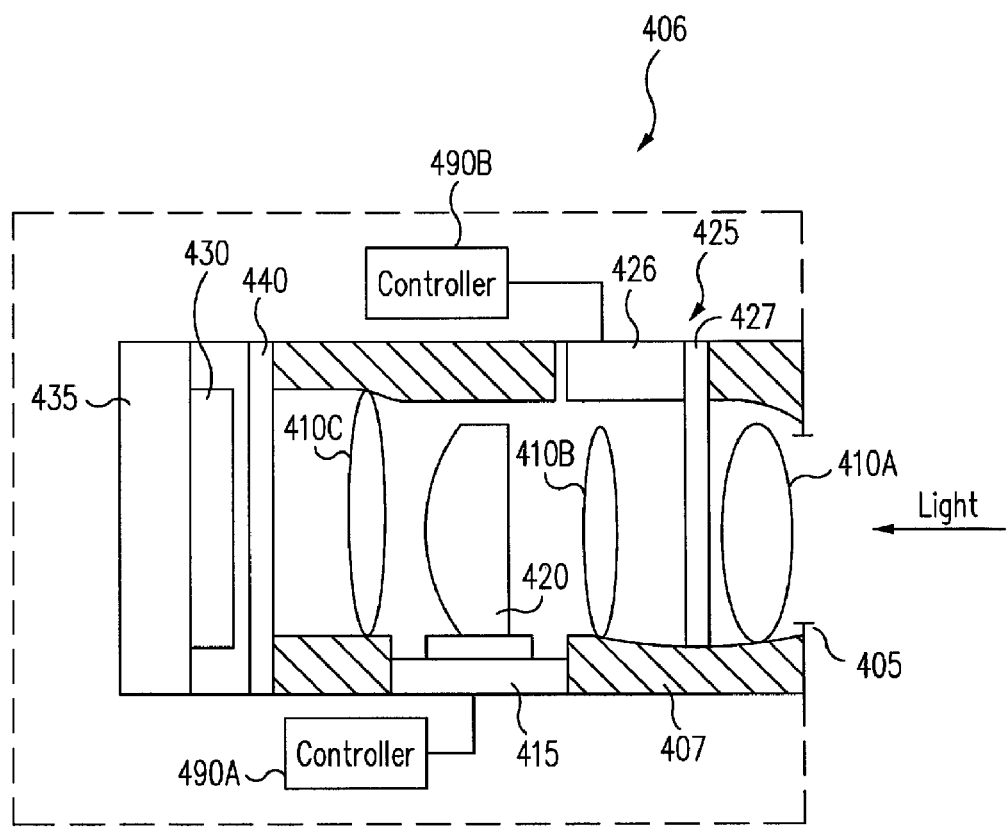
FIG. 4 is a side view of a device including a lens assembly such as the assemblies illustrated in FIGS. 1, 2, and 3.

A lens system such as the examples shown in FIGS. 1, 2, and 3 may be included in an electronic device such as device 406 of FIG. 4. Device 406 may comprise a miniature camera, and may provide further functionality (e.g., it may be a miniature camera included as part of a device that provides multiple functions).

Miniature camera systems may be used in fixed or mobile devices, which may have only camera functionality or may be multi-function devices.

For example, miniature cameras may be provided as part of fixed security systems (e.g., mounted to a structure in a fixed position). Alternately, miniature cameras may be integrated with mobile devices, such as mobile security systems (e.g., a camera in a common household not mounted in a fixed position). Other well-known examples of mobile devices include cell phones, laptop computers, and personal digital assistants (PDAs).

In the implementation of FIG. 4, device 406 includes a miniature camera configured for advanced functionality such as auto-focus, image stabilization, zoom, shuttering, or the like. A lens holder 407 includes features for positioning a plurality of lenses in the optical path of imaging light received at a light receiving end of lens holder 407. In the implementation of FIG. 4, lens holder 407 positions three plastic lenses 410A to 410C, and positions a stage system 415 with a glass plano-convex lens 420 mounted thereon.

In operation, light is incident on first plastic lens 410A through aperture stop 405. Shuttering may be provided with a shuttering system 425 including a shutter blade 427 and actuator 426. A controller 490B may provide a signal to actuator 426 to change the position of shutter blade 427.

Light is then incident on second plastic lens 410B, and then glass plano-convex lens 420. In FIG. 4, lens 420 is a moveable lens positioned on a stage system 415. Stage system 415 includes an actuator which moves in response to a signal generated by a controller 490A. Light from lens 420 is incident on third plastic lens 410C, then passes through protective layer 440 to imager 430. Imager 430 is in communication with circuitry such as printed circuit board 435, to process received image information.

Although FIG. 4 illustrates a device 406 with a miniature camera having advanced functionality, the systems and techniques described herein may be used with other configurations, such as devices with fixed focus miniature cameras. Additionally, different lens configurations are possible.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. An optical system, comprising:
a lens holder including mounting features to position a plurality of lenses, the mounting features including:
mounting features to position a first plastic lens proximate an aperture end portion of the lens holder;
mounting features to position a glass plano-convex lens having a substantially planar surface along an optical path through an interior of the lens holder; and,
mounting features to position a second plastic lens between the first plastic lens and the glass plano-convex lens.

2. The system of claim 1, wherein the lens holder further comprises the second plastic lens positioned in the mounting features to position the second plastic lens.

3. The system of claim 1, wherein the mounting features to position the glass plano-convex lens comprise mounting features to position a stage having the glass plano-convex lens mounted thereon.

4. The system of claim 1, wherein the lens holder further comprises the first plastic lens engaged in the mounting features to position the first plastic lens.

5. The system of claim 1, further comprising an imager positioned proximate an imaging end of the lens holder opposite the aperture end portion.

6. The system of claim 5, wherein the imager is positioned in mounting features of the lens holder.

7. The system of claim 5, wherein the lens holder further comprises:
a third plastic lens engaged in mounting features and positioned between the plano-convex lens and the imager.

8. The system of claim 1, wherein the optical system comprises a miniature camera, and wherein the lens holder further comprises:
a third plastic lens positioned in mounting features to receive light from the glass plano-convex lens; and,
an imager configured to receive light from the third plastic lens and further configured to generate imaging information indicative thereof.

9. The system of claim 1, wherein the optical system includes a miniature camera including the lens holder.

10. The system of claim 9, wherein the optical system further includes a mobile electronic device including the miniature camera.

11. The system of claim 1, wherein the mounting features are configured to position the glass plano-convex lens with the substantially planar surface of the glass plano-convex lens positioned toward the aperture end portion of the lens holder.

12. A mobile electronic device, comprising:
a miniature camera having a light receiving end portion and an imaging end portion, the miniature camera comprising:
a first plastic lens positioned at the light receiving end portion of the miniature camera;
a glass plano-convex lens positioned between the first plastic lens and the imaging end portion of the miniature camera;
a second plastic lens positioned between the first plastic lens and the glass plano-convex lens;
an imager positioned proximate the imaging end portion of the miniature camera; and,
a third plastic lens positioned between the glass plano-convex lens and the imager.

13. The device of claim 12, wherein the glass plano-convex lens and the first plastic lens are included in a plurality of lenses, and wherein at least one lens of the plurality of lenses is positioned on a moveable stage.

14. The device of claim 13, wherein the moveable stage is in communication with an actuator configured to apply force to the moveable stage, and wherein the actuator is in communication with a controller configured to generate an excitation waveform indicative of a desired position of the at least one lens.

15. The device of claim 12, wherein the miniature camera further includes a shutter system.

16. The device of claim 12, wherein the miniature camera is configured to provide at least one function selected from the group consisting of auto-focus, zoom, and image stabilization.

17. The device of claim 12, further comprising at least one from the group consisting of a mobile security device, a cell phone, a mobile computing device, and a personal digital assistant.

* * * * *